Dec. 7, 1965     E. KOWALSKI     3,222,523

IONIZATION CHAMBER TYPE RADIATION DOSIMETER

Filed May 2, 1962

INVENTOR
EMIL KOWALSKI
BY
MORGAN, FINNEGAN, DURHAM & PINE
ATTORNEYS

United States Patent Office 3,222,523
Patented Dec. 7, 1965

3,222,523
IONIZATION CHAMBER TYPE RADIATION DOSIMETER
Emil Kowalski, Cham, Zug, Switzerland, assignor to Landis & Gyr, A.G., Zug, Switzerland, a corporation of Switzerland
Filed May 2, 1962, Ser. No. 191,836
Claims priority, application Swtizerland, May 19, 1961, 5,916/61
13 Claims. (Cl. 250—83.6)

This invention relates to dosimeters and more particularly to portable irradiation dosimeters.

Small, portable ionization dosimeters, which can be worn in the pocket or elsewhere on the body, are used for measuring the dose of radiocative irradiation received by individual persons. In many cases they are shaped like fountain pens; there are also dosimeters shaped like flat medallions.

An ionization dosimeter substantially comprises and ionization chamber and capacitance connected in parallel therewith which is formed either by a special, highly-insulated capacitor or else merely by the inherent capacitance of the chamber. All known ionization dosimeters are based on the same principle and differ only in constructional features, for example in the provision of switches for charging the capacitance, in the construction of the capacitor, in the arrangement of the electrodes of the ionization chamber, and in the design of the measuring device.

Before measurement is commenced the capacitance is charged to a given voltage $U_o$. If the dosimeter is exposed to ionizing rays, an electrical current then flows through the ionization chamber and diminishes the charge stored in the capacitance by an amount proportional to the total irradiation dose received in a given case. If the remaining residual voltage $U_m$ of the capacitance is measured after a given time $t$, reckoned from the time when the capacitance was charged, the dose received during this time can quite simply be deduced from the difference $U_o-U_m$.

The dosimeter reading can be taken either at a desired time with the aid of an external measuring instrument to which the dosimeter is connected for this purpose, or by means of a quartz thread electrometer fitted in the dosimeter. In the latter case, the reading may be taken at any time without special auxiliary appliances. The measuring instruments are preferably calibrated directly in dose units (röntgens, milliröntgens), the zero dose reading corresponding to the charging voltage $U_o$.

The two ionization chamber electrodes and the plates of the capacitance have to be kept insulated from each other in a mechanically defined position. An inevitable property of insulation is its parasitic leakage resistance R. Its product with the capacitance value C gives a time constant RC, which depends on the properties of the insulator material and is little affected by the construction. Although with the most modern insulators made of polymeric synthetics it is possible to obtain time constants of the order of $100a$ ($a$=year), with present-day mass production only a time constant of less than $10a$ can be assured at tolerable expense.

The above-mentioned leakage resistance R causes capacitance discharge spontaneously even when no irradiation is present. The dosimeter voltage accordingly gradually decreases with time $t$; this happens with an exponential progression, which for low $t$ values can be approximately represented by a linear progression $$U=U_o\left(1-\frac{t}{RC}\right)$$

Owing to the leakage resistance, the dose read at the end of a time $t_m$ after the capacitance was charged is subject to an error which is approximately equal to $$\frac{t_m}{RC}\cdot D_{max.}$$

where $D_{max.}$ is the upper limit of the measuring range of the dosimeter. In the case of a dosimeter with a measuring range of $500r$ and a time constant of $RC=10a$, then at the end of a year each reading is subject to an inaccuracy of about $50r$, i.e. 10% of the measuring range.

Further sources of error are provided by inaccurate setting of the charging voltage U and by changes in the dosimeter voltage due to polarization effects such as can be observed in highly insulated capacitor foils.

In a known dosimeter the insulation of the ionization chamber is improved with the aid of an auxiliary electrode known as a guard-ring. This divides the insulating distance between the chamber electrodes in half and is kept constantly at high potential. To prepare the dosimeter for measuring, one chamber electrode, the capacitance of which in relation to the wall of the chamber is used as a source of voltage for feeding the chamber discharge, is temporarily conductively connected to the auxiliary electrode. Owing to the fact that the auxiliary electrode with its constant potential is connected to the insulating medium between the electrode and the wall of the chamber, the chamber electrode cannot discharge again through the insulating medium. It is on the contrary kept at its starting potential by additional charging if a weak discharge current, which is insignificant for measurment, flows through the ionization chamber as a result of the background activity. The disadvantage of this is that the dosimeter has to be equipped with an external source of voltage and needs a wire connection between this source and the auxiliary electrode.

A three-electrode-dosimeter is known, wherein the collector electrode of the ionization chamber is completely screened from the coated electrode by a so-called polarizing electrode. The ionization chamber with its inherent capacitance, and the capacitance of the coated electrode against the polarizing electrode, are charged to the same voltage. The value read is the potential difference between the inner collector electrode and the outer coated electrode, which is directly proportional to the dose received. The insulation of the actual ionization chamber is very good, but the accuracy of measurement is limited by the leakage resistance between the coated and the polarizing electrode, since the voltage at this capacitance is used as a standard voltage for the reading.

A known dosimeter may also be mentioned, wherein an ionization chamber is used which, when irradiation takes place, supplies a current by its own action, i.e. without voltage being applied, to charge an integrating capacitance. This dosimeter is, however, restricted to measuring small doses, since inevitable charging losses due to carrier recombination occur when larger doses are received.

In all the known dosimeter constructions with the exception of the last, accuracy of measurement is restricted by the fact that one and the same capacitor is used both as a source of voltage for the ionization chamber and as an integrator for the chamber current. Both functions of the capacitor are subject to error. The fact that the dose is determined from the residual voltage of the voltage source means that the dose reading includes the sum of both errors.

It is accordingly an object of the invention to provide a dosimeter in which the foregoing errors are reduced. This and other objects and advantages of the invention will be set forth hereinafter and in part will be obvious herefrom, or may be learned by practice with the invention, the same being realized and attained by means of the steps, methods, compositions, combinations and improvements pointed out in the appended claims.

According to the invention, an irradiation dosimeter is provided of the type having an ionization chamber to which a voltage is applied and through which a current flows when irradiation occurs, the time integral of said current serving as a measure of the dose, and wherein the above-mentioned disadvantages are avoided by providing separate capacitances for supplying the ionization chamber voltage and for integrating the ionization chamber current respectively. These two capacitances may be in the form of spatially separated capacitors. This is not, however, essential; instead of spatially separated capacitors two partial capacitances of one and the same capacitor can also be used. In both cases it is important for the two capacitors to be dielectrically separated from each other, i.e. for their dielectrics not to be in contact with each other.

By virtue of the distribution of the capacitive function to two separate capacitances, the error is also separated; provided it remains above the saturation voltage, the voltage of the feeding capacitance may be altered at will without affecting the reading error. Moreover, in the arrangement according to the invention, a neutral point is formed in the connection between the two capacitances and this point may be connected to the case of the dosimeter to form a "virtual" ground or common potential point. This point can advantageously be connected to an auxiliary electrode which divides the chamber insulation and has an action similar to the guard-ring already mentioned. This enables the insulation of the chamber to be considerably improved.

The invention consists in the novel parts, constructions, arrangements, combinations and improvements herein shown and described.

Serving to illustrate exemplary embodiments of the invention are the drawings of which:

Figure 1:
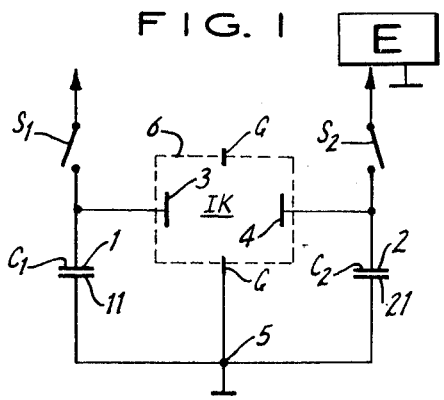
FIG. 1 is a circuit diagram.

As shown in FIG. 1, the dosimeter according to the invention comprises an ionization chamber IK with discharge electrodes 3 and 4, two capacitances $C_1$ and $C_2$ and connecting members $S_1$ and $S_2$, here shown as switches. The plates 11 and 21 of the two capacitances $C_1$ and $C_2$ are conductively connected. Their common connection is connected, in turn, to the dosimeter casing at the junction 5. The two other plates 1 and 2 of the capacitances $C_1$ and $C_2$ are each connected to one of the two chamber electrodes 3 and 4.

The switches $S_1$ and $S_2$ can be externally operated in known manner, for example, by a magnetic field. The chamber insulation 6 may if appropriate be divided by an auxiliary electrode G acting as a guard-ring, in which case G is also connected to the junction 5 which is at casing or ground, i.e., common potential.

The arrangement works as follows: Before the beginning of the measuring or monitoring time the capacitance $C_1$ is connected to an external voltage source by closing the switch $S_1$ and is charged to a given voltage $U_0$ from this source. By closing the switch $S_2$ a discharge circuit for the capacitance $C_2$ is closed and the capacitance discharged.

If ionizing irradiation strikes the dosimeter, a charge proportional to the dose is transported through the ionization chamber IK under the influence of the charging voltage across $C_1$, and the capacitance $C_2$ is charged by this amount. The voltage at $C_2$ rises in proportion to this charge and thus provides a direct measure of the irradiation dose received. The voltage is measured at $C_2$ by connecting $C_2$ through the switch $S_2$ to an electrometer E. After this $C_1$ can be re-charged and $C_2$ discharged, and the dosimeter is ready for a fresh measuring process.

Figure 2:
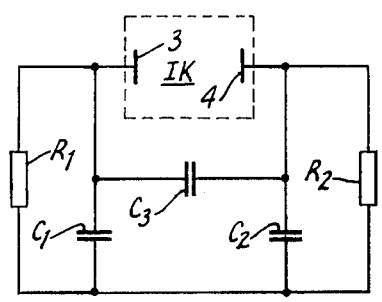
FIG. 2 is the equivalent circuit diagram of the dosimeter according to the invention.

The equivalent circuit diagram in FIG. 2 shows that, although insulating resistors $R_1$ and $R_2$ are parallel to the capacitances $C_1$ and $C_2$, owing to the action of the auxiliary electrode G there is no insulating resistor parallel to the ionization chamber IK. Thus, the inclusion of the auxiliary electrode G results in a significant improvement in the insulation. There is only a parasitic capacitance $C_3$ parallel to the ionization chamber, but this can be kept very small.

By reason of discharge through the insulating resistor $R_1$, the supply voltage of the ionization chamber drops at a time constant $R_1C_1$; this voltage drop is, however, harmless provided that it is sufficiently low to insure that the chamber voltage does not drop below saturation voltage during the measuring time.

The charge accumulated in $C_2$ is diminished in the course of time by the insulating resistor $R_2$. But the resulting error does not start to arise until irradiation begins; the error is proportional to the dose received. Thus, each dose received, independently of its size, is subject to the same relative error, so that even very small doses can be measured with sufficient accuracy.

The possibility of any dangerous irradiation occurring will generally result from perceptible events, such as an accident, the breakage of a specimen, or the explosion of an atomic bomb, and immediately following such an event any dosimeters which may be in the radiation area will be read. The time between irradiation and reading will therefore generally be much shorter than the time the dosimeter has been kept in readiness, and the relative measurment error is thus correspondingly small.

The changes in voltage at the capacitance $C_1$, which serves as a voltage source, are transferred through the parastitic chamber capacitance $C_3$ to the capacitance $C_2$, so that a voltage appears at $C_2$ even if there is no radiation. This additional error determines the lower sensitivity limit of the dosimeter. Taking $C_1=C_2=C$ and assuming that $R_1=R_2=R$, the ratio of the upper to the lower limit of the measuring range is of the order of $$\frac{RC}{t_m}\cdot\frac{C}{C_3}$$

where $t_m$ is the reading time. This ratio can be made very large by choosing a very high value for C and a very low value for $C_3$.

The following compares the ratios obtained with the dosimeter according to the invention to those obtained with known dosimeters:

With a dosimeter where one and the same capacitance is used both as a voltage source and to integrate the chamber current, the reading error is approximately $$D=\frac{t_m}{RC}\cdot D_{max}.$$

$t_m$ being the time between charging and reading of the dosimeter, $D_{max}$ the upper limit of its range, and RC the time constant of its capacitance.

The relative measurement error in relation to the measurement value D $$\rho=\frac{\Delta D}{D}=\frac{t_m}{RC}\cdot\frac{D_{max.}}{D}$$

is dependent on the measurement value and becomes very large when the dose readings are small. If $D_{min}$ is the smallest value which is desired to be indicated, and $\rho_{max}$ is taken as the maximum measurement error, the time constant must fulfill the equation $$RC=\frac{t_m}{\rho_{max.}}\cdot\frac{D_{max.}}{D_{min.}} \quad (1)$$

The time constant of a capacitor is proportional to the specific resistance of its dielectric, the time constant being approximately $1a$ in the case of a specific resistance of $10^{20}$ ohm cm. It is in fact possible, by suitably treating the insulating foils, even to obtain the value of $10^{21}$ ohm cm. for the specific resistance. However, owing to the reduction of this value through radio-active irradiation and through foreign matter which is too slight to define, one can be sure of obtaining only the above value of $10^{20}$ ohm cm. Thus, the dosimeter properties defined by $t_m$, $\rho_{max}$ and $D_{max}/D_{min}$ are restricted in accordance with the above Equation 1.

Calculation of the electrical properties of the dosimeter according to the invention, on the other hand, gives the following two equations for the relative measurement error and the ratio of the range-limits $D_{max}/D_{min}$:

$$\rho = \frac{t_m - t_o}{RC} \cdot \frac{D_{min.}}{D_{max.}} = 5 \cdot \frac{t_m}{RC} \cdot \frac{C_3}{C}$$

in which $t_m$ again refers to the time between charging and reading, $t_o$ to the time between charging and exposure to irradiation, C to the capacitance of the two capacitors, which are assumed to be equal, and $C_3$ to the self-capacitance of the ionization chamber. In this case, therefore, the time constant must satisfy the equations $$RC = \frac{t_m - t_o}{\rho_{max.}} \text{ and } RC = 5t_m \cdot \frac{D_{max.}}{D_{min.}} \cdot \frac{C_3}{C} \quad (2)$$

Thus, the time constant is no longer proportional to the total measuring time $t_m$, as in the case of known dosimeters, but only to the time $t_m - t_o$ between exposure to irradiation and reading.

Where there are very wide ranges between the limits $D_{min}$ and $D_{max}$ and not over-small values for the maximum admitted error $\rho_{max}$, only the right-hand equation of the Equations 2 determines the time constant. Given the same qualities of dosimeter, therefore, the dosimeter according to the invention can have a time constant which is smaller than that of a known dosimeter by the factor $$F = \frac{\frac{t_m}{\rho_{max.}} \cdot \frac{D_{max.}}{D_{min.}}}{5t_m \cdot \frac{D_{max.}}{D_{min.}} \cdot \frac{C_3}{C}} = 0.2 \frac{C}{C_3} \cdot \frac{1}{\rho_{max.}}$$

In other words, the insulation of the dosimeter according to the invention is improved by the factor F.

As already mentioned above, the two capacitances of the dosimeter according to the invention may take the form either of two spatially separated capacitors or of the two partial capacitances of a single capacitor, the dielectrics of these being separated only electrically. The double capacitor may, for example, be constructed as in FIG. 3.

Figure 3:
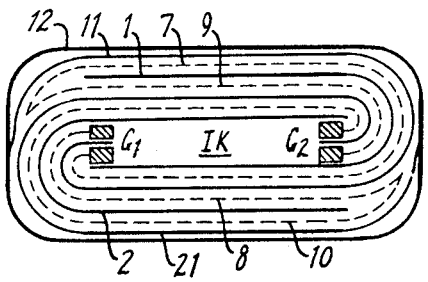
FIG. 3 is a section through a twin capacitor suitable for a dosimeter according to the invention.

The double capacitor in FIG. 3 takes the form of a coil capacitor and is coiled about the ionization chamber IK, which is of flat, rectangular cross-section. 12 is the dosimeter casing enclosing the capacitor and is also rectangular in section. The conductor foils 1 and 2 are connected to the chamber electrodes numbered 3 and 4 in FIGS. 1 and 2, while the conductor foils 11 and 21 are conductively connected to the casing 12.

The grounded conductor foils 11 and 21 are somewhat wider than the insulating foils 7 to 10 (illustrated by broken-line) located between them, so that the insulating foil pairs 7, 9 and 8, 10 cannot contact each other at the edges. This prevents any parasitic resistance between the two chamber electrodes. The ends of the metal foils 11 and 21 joined to the casing 12, are connected to the metal bars $G_1$ and $G_2$ respectively. These bars together form the auxiliary electrode G shown in FIG. 1, which divides the insulation between the chamber electrodes in half.

To summarize, therefore, the dosimeter according to the invention has the following advantages over known dosimeters: For the same accuracy of measurement much lower demands are made of the capacitor time constant and thus of the insulation. Moreover, the measuring range is extended to small values and the relative measurement error is constant over the whole range. The charging voltage with which the dosimeter is charged need not be set exactly to an absolutely fixed value. The indicating apparatus measures, not a potential difference, but rather the full value of a voltage, so that less accuracy is demanded. As a result there is also a possibility of reading over several decades on a logarithmic scale or in several linear ranges. In addition, there is no indication unless radiation is received. All these advantages are obtained without the dosimeter being appreciably more complex in construction than known dosimeters.

The invention is not limited to the specific mechanisms shown and described but departures may be made therefrom within the scope of the accompanying claims.

What is claimed is:

1. An irradiation dosimeter comprising an ionization chamber through which current can flow at a rate which is a function of the radiation to which the chamber is subjected; first capacitive means connected to said chamber and being electrically chargeable to supply an operating voltage to said chamber; second capacitive means connected to said chamber for integrating the current flow through said chamber and for providing a measure of the radiation dose; and electrical charging circuit means interconnecting said chamber and said first and second capacitances for charging said second capacitive means only from said first capacitive means via said ionization chamber.

2. An irradiation dosimeter according to claim 1 further including a first switch connected to said first capacitive means being adapted, when closed, to complete a charging circuit; and a second switch connected to said second capacitive means being adapted, when closed, to complete a discharging circuit.

3. An irradiation dosimeter according to claim 1 in which said capacitive means are capacitors each having one plate connected to a common potential.

4. An irradiation dosimeter according to claim 1 including an insulation-dividing electrode in the insulation of said ionization chamber, said electrode being connected to said common potential.

5. An irradiation dosimeter according to claim 1, wherein said capacitances comprise separate capacitors.

6. An irradiation dosimeter according to claim 1, wherein said capacitances comprise partial capacitances of a double capacitor, the dielectrics of which capacitances are not in immediate contact.

7. An irradiation dosimeter comprising an ionization chamber including a pair of electrodes for permitting current flow from one of said electrodes to the other at a rate which is a function of the radiation to which said chamber is subjected; a first capacitive means including a first pair of conductive foils, one of said conductive foils of said first pair being connected to one of said electrodes, and the other of said foils being connected to a common; a second capacitive means including a second pair of conductive foils, one of said conductive foils of said second pair being connected to the other of said electrodes and the other of said foils being connected to said common; a plurality of insulating foils interleaved between said conductive foils; said conductive foils being spirally wound about said ionization chamber with one of said conductive foils connected to said common spaced between all adjacent portions of conductive foils connected to said electrodes.

8. An irradiation dosimeter according to claim 7 further including a conductive outer casing and wherein one conductive foil of each of said pairs is connected to said casing to form said common.

9. An irradiation dosimeter according to claim 7 wherein said conductive foils extend somewhat beyond the edges of said insulating foils to thereby prevent the latter from contacting one another.

10. An irradiation dosimeter according to claim 7 further including electric charging circuit means for charging said second capacitive means only from said first capacitive means via said ionization chamber so that said second capacitive means integrates the current flow passing through said ionization chamber and thereby provides a measure of the radiation dose.

11. An irradiation dosimeter according to claim 10 further including a first switch connected to the non-common conductive foil of said first pair for completing a circuit, when closed, for placing a known charge on said first capacitive means.

12. An irradiation dosimeter according to claim 10 further including a second switch connected to the non-common conductive foil of said second pair for completing a circuit, when closed, for measuring the potential across said second capacitive means as being a function of the radiation dose and for thereafter discharging the same.

13. An irradiation dosimeter according to claim 7 wherein said ionization chamber includes a pair of rectangular electrodes spaced apart by insulators, said insulators being interrupted by electrically conductive bars, and wherein the free ends of said conductive foils connected to said common are connected to said conductive bars.

References Cited by the Examiner

UNITED STATES PATENTS

| | | | |
|---|---|---|---|
| 2,841,716 | 7/1958 | Rich | 250—83.3 |
| 2,884,533 | 4/1959 | Richard-Foy | 250—83.3 |
| 3,075,081 | 1/1963 | Landsverk et al. | 250—83.3 |
| 3,110,808 | 11/1963 | Fauser et al. | 250—83.3 |

References Cited by the Applicant

FOREIGN PATENTS

| | | |
|---|---|---|
| 874,620 | 4/1953 | Germany. |
| 1,039,144 | 9/1958 | Germany. |
| 708,892 | 5/1954 | Great Britain. |
| 805,912 | 12/1958 | Great Britain. |
| 909,719 | 10/1962 | Great Britain. |

RALPH G. NILSON, *Primary Examiner.*

ARCHIE BORCHELT, *Examiner.*